United States Patent [19]
Hayes

[11] Patent Number: 5,173,956
[45] Date of Patent: Dec. 22, 1992

[54] THERMALLY DRIVEN OPTICAL SWITCH METHOD AND APPARATUS

[75] Inventor: Robert R. Hayes, Calabasas, Calif.

[73] Assignee: Hughes Aircraft Company, Los Angeles, Calif.

[21] Appl. No.: 649,517

[22] Filed: Feb. 1, 1991

[51] Int. Cl.[5] ............................................. G02B 6/26
[52] U.S. Cl. ................................................. 385/16; 385/4
[58] Field of Search ............... 350/96.13, 96.14, 96.15; 385/1, 4, 11, 15, 16, 18

[56] References Cited

U.S. PATENT DOCUMENTS

| | | | |
|---|---|---|---|
| 4,447,116 | 5/1984 | King et al. | 350/96.13 |
| 4,690,488 | 9/1987 | Gee et al. | 350/96.15 X |
| 4,775,207 | 10/1988 | Silberberg | 350/96.13 X |
| 4,795,225 | 1/1989 | Sakai et al. | 385/16 |
| 4,820,009 | 4/1989 | Thaniyavarn | 350/96.13 |
| 4,940,305 | 7/1990 | Thaniyavarn | 350/96.13 X |

OTHER PUBLICATIONS

Haruna and Koyama, "Thermo-Optic Effect in LiNbO3 for Light Deflection and Switching", *Electronics Letters*, vol. 17, No. 22, Oct. 29, 1981, pp. 842-844.
Haruna and Koyama, "Thermo Optic Deflection and Switching in Glass", *Applied Optics*, vol. 21, No. 19, Oct. 1, 1982, pp. 3461-3465.
N. B. J. Diemeer, et al., "Polymeric Optical Waveguide Switch Using the Thermooptic Effect", *Journal of Lightwave Technology*, vol. 7, No. 3, Mar. 1989, pp. 449-453.
"Modulation Behavior of Integrated Optical Directional Couplers", H. Schlaak, *J. Optical Comm.* 5, p. 122 (1984).
"Switched Directional Couplers with Alternating $\Delta\beta$", *IEEE J. Quantum Electronics*, QE-12, p. 396 (1976).

*Primary Examiner*—John D. Lee
*Assistant Examiner*—Phan Thi Heartney
*Attorney, Agent, or Firm*—V. D. Duraiswamy; W. K. Denson-Low

[57] ABSTRACT

Optical switching between two waveguides with a common cladding interguide region is achieved by passing a current through the interguide region to heat it and thereby alter its refractive index, and controlling the current to control optical switching between the two guides. Rib waveguides on a common semiconductor layer are preferably used, with the interguide region having a lesser thickness than the core regions. Current is transmitted by forward biasing a Schottky contact to the interguide region. The switch is capable of operation at switching rates of 1 MHz.

27 Claims, 3 Drawing Sheets

THERMALLY DRIVEN OPTICAL SWITCH METHOD AND APPARATUS

GOVERNMENT RIGHTS

This invention was made with Government support under Contract No. F30602-88-C-0039 awarded by the Department of the Air Force. The Government has certain rights in this invention.

BACKGROUND OF THE INVENTION

1. Field of the Invention

This invention relates to optical switches, and more particularly to optical switches in which switching is accomplished by heating an interguide region between two optical waveguide cores to alter its refractive index.

2. Description of the Related Art

Optical switching between two waveguides has been accomplished in the past by altering the index of refraction of the guiding material at some critical point within the switch. In a directional coupler switch, which consists of two parallel waveguides sufficiently close to one another to exhibit evanescent coupling, one can either change the rate at which power is transferred from one guide to the other by changing the index of refraction in the interguide region (thereby changing the evanescent coupling), or one can frustrate the coherent power transfer process completely by appropriately changing the index of one guide relative to the other. (The first approach is called "delta-kappa" switching, the second "delta-beta"). A third approach, called "intersectional" switching, uses a reflective barrier installed at the crossing point of two intersecting waveguides. Small changes in the refractive index of this barrier either allow the light to pass through the barrier and into the first waveguide, or cause it to undergo total internal reflection into the second.

Various mechanisms have been used to control the refractive index of the guiding material. One approach uses the electro-optic effect to vary the refractive index by applying an electric field across the guiding region, normally by means of a reverse-biased Schottky diode. Another approach relies upon the injection of free-carriers into the region. While useful switching rates have been achieved with these techniques, the electro-optic approach is dependent upon the polarization of the beam. The free-carrier injection approach, although polarization independent, suffers from high losses due to carrier absorption.

One can also change the index of refraction by heating the guiding material. This has been done by putting a metal strip of film over the critical region; current is passed through the strip to heat it, and the heat spreads into the underlying material, raising the temperature locally. Because of the finite thermal coefficient of the index of refraction of the guiding material, a localized change in the index results.

A thermal transfer technique for optical switching is disclosed in Haruna and Koyama, "Thermo-Optic Effect in LiNbO$_3$ for Light Deflection and Switching", *Electronics Letters*, Vol. 17, No. 22, Oct. 29, 1981, pp. 842–844. In this demonstration a layer of NiCr was vacuum evaporated as a strip heater on a LiNbO$_3$ crystal. When a 60 Hz AC voltage was applied to the strip heater, a laser beam directed through the crystal was deflected. Application of this approach to light switching as well as optical deflection was demonstrated by placing a small heater on a waveguide to provide a partial index change. Input and output channel waveguides were connected by a bridge waveguide that was covered directly by a NiCr film heater with a resistance of 790 ohms. The application of appropriate voltages to the film heater resulted in a thermo-optically induced waveguide which bridged the input and output channel waveguides. In the absence of the applied voltage to the film heater, the incident guided modes leaked to the substrate.

In Haruna and Koyama "Thermo Optic Deflection and Switching in Glass", *Applied Optics*, Vol. 21, No. 19, Oct. 1, 1982, pp. 3461–3465, a NiCr film heater was vacuum evaporated on a glass substrate. The film heater was supplied by a pulsed voltage with a 200-Hz repetition rate and a 2-msec pulse width in one instance, and a 40-Hz repetition rate and 5-msec pulse width in another instance; titanium-sputtered film heaters were used for the second case. In the first test the heater was used to control optical switching between an output waveguide and the substrate, while in the second test the heater was used to control optical switching between two output waveguides.

More recently, beam deflection within a planar waveguide was achieved with a silver stripe heater having a resistance of 73.4 ohms evaporated upon a polymethyl methacrylate buffer layer on a polyurethane waveguide structure. Switching times of about 10-ms were measured, which the authors believed could be reduced to a few milliseconds with optimized thermal design and regulated power dissipation in the heater. N. B. J. Diemeer et al., "Polymeric Optical Waveguide Switch Using the Thermo-Optic Effect", *Journal of Lightwave Technology*, Vol. 7, No. 3, March, 1989, pages 449–453.

This application describes deflection of a light beam within a slab, and not the switching of light between waveguides, so that it is not a pure waveguide switch.

Unlike the electro-optic switches, the thermal switches discussed above have the advantages of operating independent of the input beam polarization, and being applicable to relatively thick (on the order of 3-5 microns) waveguides. However, their switching speeds are quite slow. The Haruna/Koyama devices were found to have a switching speed on the order of 1 ms, while the Diemeer device if optimized was expected to have a switching speed of "a few" ms. These relatively slow responses correspond to switching rates of not more than about 1 KHz, which is too limited for most applications.

SUMMARY OF THE INVENTION

The present invention offers a way to increase the switching speed of thermal switches by three orders of magnitude while at the same time retaining all of the positive attributes of thermal switching, i.e., polarization independence, low loss, and the ability to operate in materials having no electro-optic effect. The invention uses optical waveguide geometries that have been successfully used by others for electro-optic, current injection and thermal switching. The uniqueness is in the material system chosen and the method of applying heat.

The refractive index of the interguide region in an optical switch is controlled in accordance with the invention by passing a current through the region to heat it, thereby adjusting its refractive index. With the waveguide structure formed from a semiconductor, a metal contact is preferably established to the semiconductor to form a Schottky diode therewith, and current is transmitted through the interguide region by forward biasing the Schottky diode.

The new method may be used to switch an optical transmission between a pair of waveguides. The waveguides include optically transmissive cores, at least a portion of which are separated by an interguide region that has a refractive index different from those of the cores. A current is passed through the interguide region to heat it and alter its refractive index. The materials for the cores and interguide region are selected, and the waveguides are configured with respect to each other, so that optical radiation transmitted along one of the cores is switched between the waveguides depending upon the refractive index of the interguide region.

In one embodiment parallel optical waveguides are fabricated on a semiconductor wafer to form an optical directional coupler. A metal contact is deposited onto the semiconductor surface between the waveguides to form a Schottky diode. Forward-biasing this diode locally heats the material between the waveguides, changing the index of refraction and, consequently, the evanescent coupling between guides. For the appropriate value of bias current, light is switched from one waveguide to the other.

The embodiment described above has a demonstrated switching speed of 0.3 microsecond which, when compared to switching times of the prior thermal switches described above, is more than 1,000 times faster. This greatly increased switching speed is directly related to the use of a semiconductor as the switch material, and to the use of internal diodes for localized internal heat generation.

This idea of using internal heating in a preferably semiconductor material to effect optical switching can be applied to other switch geometries as well. In another embodiment, the waveguides intersect each other along an intersection axis defined by the interguide region, the refractive index of which is switched between one value at which it produces total internal reflection to retain optical radiation within its original waveguide, and a second value at which the interguide region presents an optical transmission path to switch optical radiation from one waveguide to the other. Yet a third approach involves heating the core of one of two parallel waveguides to produce a switching operation by alternately enabling and inhibiting evanescent coupling between the waveguides.

The waveguide cores and interguide region are preferably formed from a common material, with the interguide region having a lesser thickness than the cores, and a refractive index with a positive thermal coefficient. With all embodiments, switching speeds on the order of 1 MHz are obtainable.

These and other features and advantages of the invention will be apparent to those skilled in the art from the following detailed description, taken together with the accompanying drawings, in which:

DETAILED DESCRIPTION OF THE INVENTION

The present invention can be implemented as an optical switch that is capable of monolithic fabrication, and utilizes local thermal heating of the switch material to change its switching rate by a change in the index of refraction for the heated portion of the switch. The term "optical" is used in its broad sense as including all radiation confinable within a waveguide, and is not limited to the visible spectrum. An important application for the invention is to allow guided light to be switched from one waveguide to another at DC to 0.5 MHz switching rates. The device is generally useful in systems that require very low-loss switches that can operate at moderate switching frequencies. One such application is in time-delay networks for phased-array antennae. Such networks require very low-loss switches having sub-microsecond rise times; a 0.3 microsecond rise time measured for a switch implemented with the present invention would satisfy this requirement. However, a relatively high power dissipation per switch could limit the number of switches used in a monolithically integrated system.

The invention relies upon a controlled thermal heating of the interguide region in an optical switch by passing a current directly through the interguide region. In a preferred implementation, the interguide region is a semiconductor upon which a metal contact is deposited. The metal contact and the semiconductor interguide region together comprise a Schottky diode, which is forward biased to operate the switch. Because a Schottky diode is a majority carrier device, forward biasing the diode does not change the free-carrier concentration in the interguide region. It does, however, cause Joule heating in this region. This heating raises the temperature of the interguide region relative to that of the waveguides proper. The switch is configured so that input light is switched between a pair of output guides, depending upon the heating of the interguide region. Switching is preferably accomplished by alternating between heated and unheated states for the interguide region, but the switch could also be configured so that the interguide region is always heated in operation, with the switching state controlled by the degree of heating.

Figure 1A:
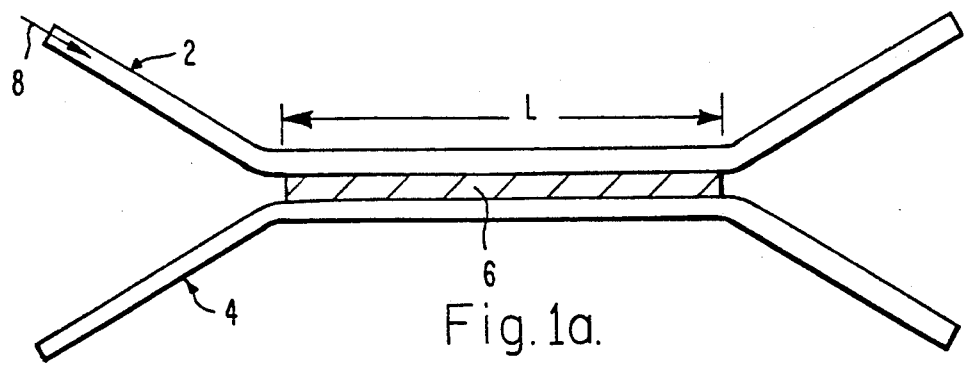
FIG. 1a is an illustrative plan view of an optical switch based upon evanescent coupling between two waveguides.

A type of thermally controlled optical switch to which the present invention is applicable is illustrated in FIG. 1a. A pair of waveguide cores 2 and 4 are mutually spaced but parallel to each other along a switching length L; the cores diverge at opposite ends of the switching length. The cores are bounded by a cladding that has a lower refractive index than that of the cores. For a simplification, the only portion of the cladding shown in FIG. 1a is the interguide region 6 that separates the cores along the switching length.

The operation of the switch can be understood by following an input optical beam 8, which is assumed to be propagating along waveguide core 2 in the direction of the switching length. The waveguide cores are close enough together over the switching length that evanescent coupling is produced between the two guides over this length. That is, an optical beam propagating along one guide will oscillate back and forth between the two guides as it progresses along the switching length. The spatial period of this oscillation depends upon the refractive index differential between the cores 2, 4 and the interguide cladding region 6.

Figure 1B:
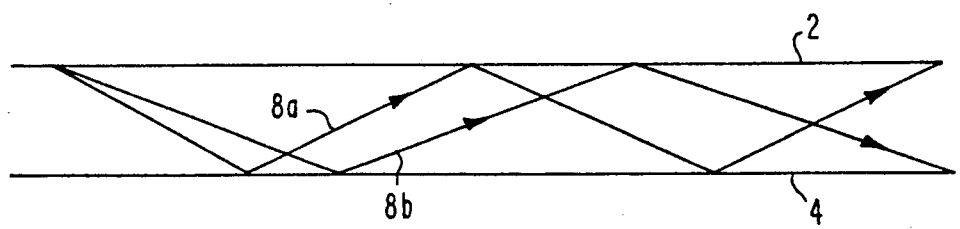
FIG. 1b is a diagram illustrating the evanescent coupling between the waveguides of FIG. 1a for two different values of interguide refractive index.

The switch is operated by alternating the refractive index of the interguide region 6 between two different values, one of which produces an odd number of evanescent coupling half-periods over the switching length L, and the other of which produces an even number of evanescent coupling half-periods over the same length. This is illustrated in FIG. 1b, in which the alternation of an input beam between the two waveguides as a result of evanescent coupling is illustrated. With a relatively large index differential, the input beam is illustrated as undergoing two complete periods of evanescent coupling along path 8a, so that it both enters and exits the switching area along waveguide core 2. If the refractive index differential between the cores and interguide region is increased by the proper amount, the evanescent coupling period increases so that there are now only one and a half coupling periods along the switching length. Accordingly, an input beam along core 2 will follow path 8b and exit the switching region along core 4. Switching of an input beam along core 2 between the output section of cores 2 and 4 is thus accomplished by switching the refractive index for interguide region 6 between two preselected values; one value corresponds to the evanescent coupling period that directs the beam into the output section of waveguide 2, and the other value corresponds to the evanescent coupling period that directs the beam into the output section of waveguide 4.

The above arrangement, in which a change in the index of refraction between waveguides causes switching, is known in the art. However, implementing it with the present invention offers distinct advantages. In addition to retaining the ability to operate in materials that do not have an intrinsic electro-optic effect (such as silicon), to operate without regard to the polarization of the incoming light and to have low insertion losses, the present invention makes it possible to operate at switching speeds that are roughly 1,000 times faster than those demonstrated by other thermal switches. High-speed switching is unique to the present approach, and is directly related to the use of a semiconductor as the switch material. Semiconductors offer two distinct advantages.

First, one can form a Schottky or PN diode in the active region of the switch. By forward-biasing this diode, one can instantaneously generate heat *within* the active region, as opposed to having it slowly diffuse in from an externally located heating element. The use of a diode structure, as opposed to an ohmic contact, localizes the generated heat to the diode depletion region within the active region. By concentrating the heat within a volume where it will produce the largest switching effect, one achieves greater efficiency. However, the use of a diode is not essential to this invention; one could use an ohmic contact and resistive heating of the moderately conductive semiconductor material, although there might be some degradation in switching speed and efficiency.

Second, semiconductor materials such as silicon and GaAs have thermal conductivities that are two orders of magnitude larger than those of glass or polymers. This much higher thermal conductivity allows the heated region of the switch to more rapidly reach its equilibrium temperature when the switch is turned on, and to more rapidly cool when the switch is turned off.

Although it might appear that the much higher thermal conductivities of semiconductors would necessitate prohibitively high drive powers, this is in fact not the case. The temperature coefficient for the index of refraction of GaAs semiconductors at wavelengths near the bandgap energy is 40 times larger than that of glass, which means that the required operating temperatures are reduced accordingly. This fact, together with the more efficient operation possible with localized internal heating, allows semiconductor switches to operate with drive powers comparable to those of the Related Art thermal switches described earlier.

Figure 2:
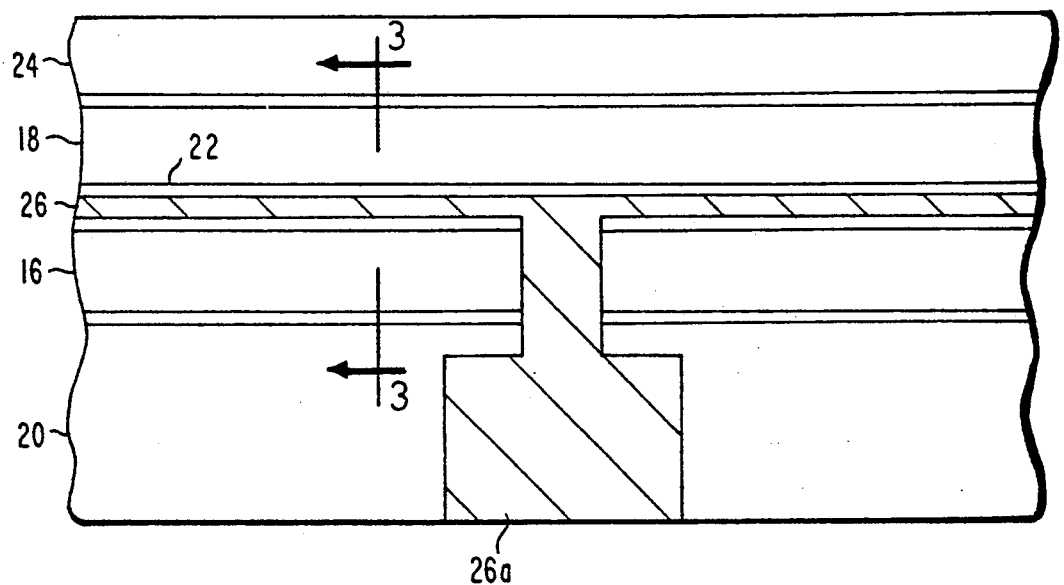
FIGS. 2 and 3 are respectively plan and sectional views of an optical switch that is based upon evanescent coupling between two waveguides and employs the present invention.
Figure 3:
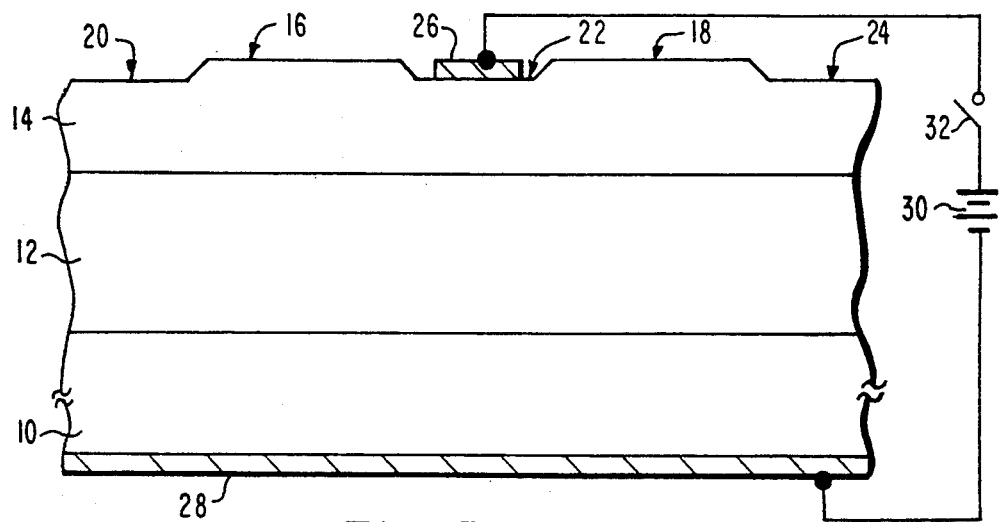

An implementation of the invention is shown in FIGS. 2 and 3. The device consists of a pair of parallel rib waveguides formed on a GaAs/AlGaAs epitaxial heterostructure using standard photolithography and wet etching techniques.

The device is formed on a GaAs substrate 10 that is doped n+. A cladding layer 12, formed from AlGaAs (preferably $Al_{0.06}Ga_{0.94}As$), is provided on the substrate, and is capped with a layer of GaAs 14. Layers 12 and 14 are preferably lightly doped, respectively on the order of $2 \times 10^{15}$ and $10^{15}/cm^3$, and are preferably on the order of 4.5 and 3.0 microns thick, respectively.

The thickness of GaAs layer 14 is somewhat greater in regions 16 and 18, preferably by about 0.2 microns, and these regions comprise rib waveguide cores. The thickness of layer 14 in the regions 20, 22 and 24 lateral to core regions 16 and 18 is somewhat less, causing the regions 20, 22 and 24 to have a slightly lower effective refractive index than the core regions 16 and 18. The regions of reduced thickness 20, 22, 24 thus act as lateral cladding layers for the core regions 16, 18. With the dimensions and compositions discussed above, the effective refractive index of the core regions 16, 18 is, for radiation with a 1.3 micron wavelength, roughly 0.0005 to 0.0010 larger than that for the lateral cladding regions 20, 22, 24. While this differential is small, it is enough to provide guidance for optical radiation propagating along core regions 16 and 18. These regions 16, 18 thus act as waveguide cores that are surrounded by cladding, with the cladding region 22 common to both waveguides and functioning as an interguide region as discussed in connection with FIG. 1a. The interguide region 22 is heated in accordance with the invention by directing a current through it at a controlled switching rate. Since the refractive index of GaAs has a positive thermal coefficient, heating the lesser thickness interguide region will increase its refractive index. The system is designed to produce an evanescent coupling between waveguide cores 16 and 18 that directs an input beam into one of the waveguides when current is flowing, and into the other waveguide when current is off.

Heating is preferably accomplished by using the interguide region 22 as one part of a Schottky diode structure, which in operation is forward biased. A Schottky electrode 26, formed from successive layers of titanium, platinum and gold, is deposited over the interguide region 22, while an ohmic contact 28 of gold-germanium, nickel and gold is deposited on the back surface of the wafer. Pad 26a provides a landing for an external electrical connection to electrode 26. A DC power source 30 is connected to Schottky electrode 26 via a switch 32 that operates at the desired waveguide switching rate. The Schottky diode, consisting of electrode 26 and interguide region 22, is forward biased when the switch 32 is closed. Current flows from electrode 26, through interguide region 22, cladding 12 and substrate 10, to the back contact 28. This heats the interguide region 22 and causes a localized increase in its index of refraction.

Complete switching of optical power from one guide to the other was achieved for an applied power of about 800 mW and a switch length of 7 mm. The on/off ratio for this device was 10 dB, and the rise time for a step electrical drive was 300 nsec; this corresponds to a switch rate of about 0.5 MHz. The calculated temperature differential between the interguide region 22 in the vicinity of electrode 26 and the center of either waveguide core 16, 18 was 1.6° C. for complete switching.

Figure 4:
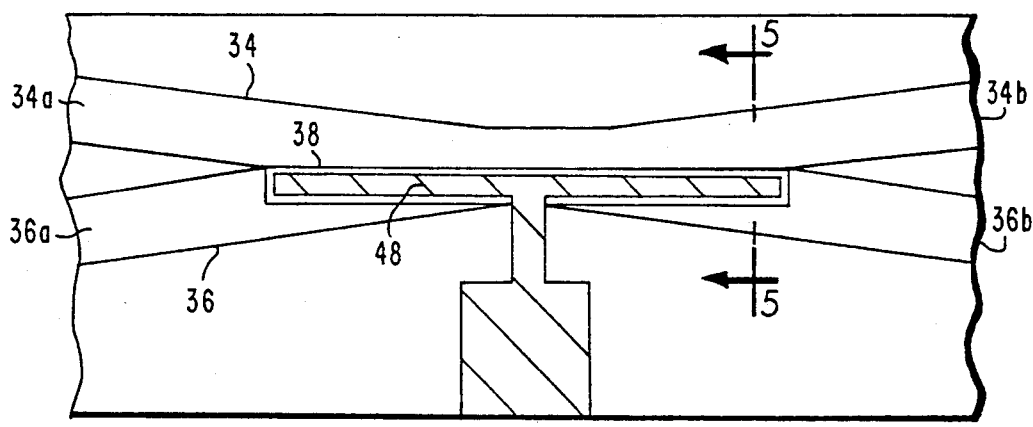
FIGS. 4 and 5 are respectively plan and sectional views of an optical switch which uses the invention and is based upon intersecting waveguides.
Figure 5:
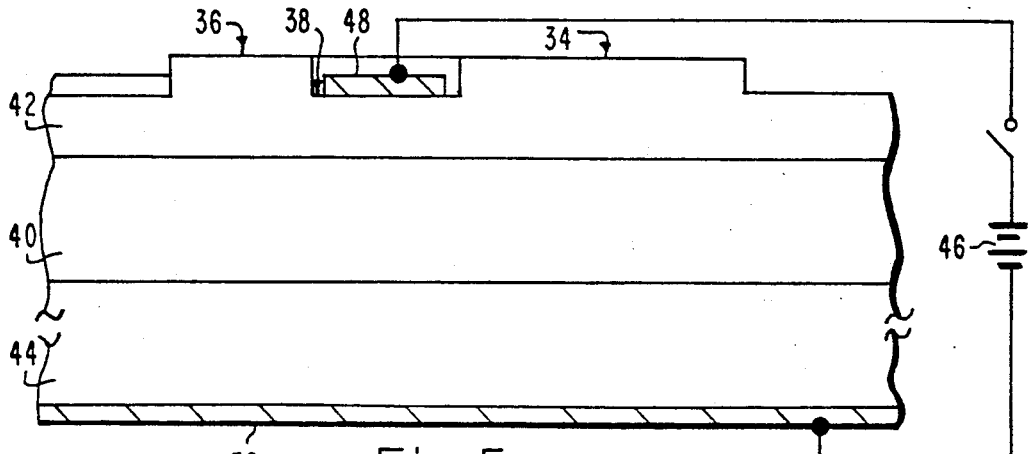

The application of the invention to another switching scheme is illustrated in FIGS. 4 and 5. In this arrangement, two rib waveguide cores 34 and 36 intersect at interguide region 38, with the output section of each guide angled back from the interguide region. The input portions of waveguide cores 34 and 36 are indicated respectively by numerals 34a and 36a, while the output sections are indicated respectively by numerals 34b and 36b. As shown in FIG. 5, the interguide region 38 is thinner than the cores 34, 36, and therefore has a lower effective refractive index. The remaining structure of the switch is similar to that of the switch previously described in connection with FIGS. 2 and 3, with a lower cladding layer 40 below the semiconductor layer 42 in which the waveguides are formed, and a supporting substrate 44. A DC power supply 46 delivers current to a Schottky electrode 48 deposited on the interguide region 38 via switch 50; the circuit is completed with a connection between power supply 46 and an ohmic contact 52 on the back surface of substrate 44.

The angle of the intersecting waveguides is selected so that, when the interguide region is unheated, an incoming light beam in input waveguide section 34a undergoes total internal reflection at the interguide region, and is reflected out through output section 34b. Closing switch 50 to forward bias the Schottky diode, formed by electrode 48 and the underlying interguide region 38, heats the interguide region and raises its refractive index up to a level substantially equal to that of the lateral waveguide cores 34, 36. This causes the interguide region to effectively disappear for an incoming beam along one of the cores, allowing the beam to pass through the interguide region and into the other core. An incoming beam along core 34a will thus switch over to the output section 36b, and vice versa. The estimated drive power for this configuration is about 100 mW, the switch length is about 0.3 mm, and the rise time is again calculated to be about 300 nsec. The switch of FIGS. 4 and 5 is thus shorter and more efficient than that of FIGS. 2 and 3. For either embodiment, switch rates of 0.5 MHz are obtainable, as opposed to the much slower switching achieved with prior thermal switching devices.

Figure 6:
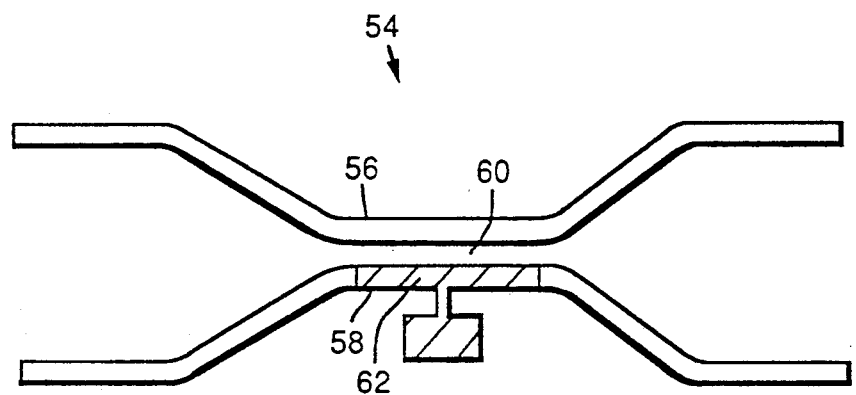
FIG. 6 is a plan view of another embodiment in which one of the waveguide cores is heated to effect switching.

Another switch configuration which can be driven by forward-bias heating is shown in FIG. 6. It consists of a directional coupler 54 that is exactly one transfer length long, with parallel cores 56 and 58 separated by an interguide region 60. A Schottky electrode 62 is formed on top of one of the two parallel cores of the coupler. In the "off" mode the electrode is unbiased, and power is transferred from one guide to the other by evanescent coupling. This complete transfer of power will only take place, however, if the speeds of light in each waveguide are identical. Changing the speed in one guide relative to the other leads to an incomplete transfer and, for just the right value of speed differential, the transfer process can be frustrated altogether. The power then remains in the input guide, allowing the coupler to function as a switch.

The speed, or equivalently, the index of refraction, is changed in one guide by forward-biasing the Schottky electrode over the core of that guide. This heats the core region under the electrode, locally raising the index of refraction A 1.6 degree C. temperature differential between guides would be enough to give complete switching action for a 2.5 mm transfer length. The drive power would then be roughly 300 milliwatts. This waveguide configuration is generally known as "delta-beta"; H. Schlaak, "Modulation Behavior of Integrated Optical Directional Couplers", *J. Optical Comm.* 5, p. 122 (1984). Although not as efficient as the intersectional switch, it has a better on/off ratio, and may thus be preferred in those applications where good isolation is essential. This approach can be directly extended to include the "delta-beta reversal" configuration, in which the switch length is now between one and two transfer lengths, and there is not one but four symmetrically-placed electrodes; see H. Kogelnik and R. Schmidt, "Switched Directional Couplers With Alternating $\Delta\beta$", *IEEE J. Quantum Electronics,* QE-12, p. 396 (1976).

While different illustrative embodiments of the invention have been shown and described, numerous variations and alternate embodiments will occur to those skilled in the art. For example, while the preferred embodiments involve heating an interguide region having a positive refractive index thermal coefficient, it would also be possible to implement the invention using negative coefficient materials. Such variations and alternate embodiments are contemplated, and can be made without departing from the spirit and scope of the invention as defined in the appended claims.

I claim:

1. A method of adjusting the refractive index differential between the core and cladding materials of an optical waveguide, comprising:
    passing a current internally through one of said materials to heat the material using forward-biased diode means to alter the refractive index of said one material, wherein said one material comprises a semiconductor, and
    adjusting said current to adjust said refractive index differential.

2. A method of adjusting the refractive index differential between the core and cladding materials of an optical waveguide comprising:
    passing a current internally through one of said materials to heat the material using forward biased diode means to alter the refractive index of said one material, wherein said one material comprises a semiconductor, and wherein said one material defines the cladding of the optical waveguide, and
    adjusting said current to adjust the refractive index of said cladding relative to that of the core, and thereby the critical angle of total internal reflection of optical radiation propagating along said core.

3. The method of claim 2, wherein said cladding and core are lateral to each other and are formed from a common material, said cladding having a lesser thickness than said core and a correspondingly lower effective refractive index in the absence of said current.

4. The method of claim 3, wherein said common material has a refractive index with a finite thermal coefficient, and the control range for said current includes a current level at which the effective refractive indices of said core and cladding are substantially equal.

5. A method of adjusting the refractive index differential between the core and cladding materials of an optical waveguide, comprising:
passing a current internally through one of said materials to heat the material using forward-biased diode means to alter the refractive index of said one material, wherein said one material comprises a semiconductor, and wherein said diode means comprises a part of said one material and a metal contact which is established to said one material to form a Schottky diode therewith, and said current is passed through said material by forward biasing said Schottky diode, and
adjusting said current to adjust said refractive index differential.

6. A method of switching optical radiation between a pair of optical waveguides, the waveguides including optically transmissive cores at least a portion of which are separated by an interguide region having a refractive index different from that of the cores, comprising:
selecting the materials for said cores and said interguide region and configuring said waveguides with respect to each other to enable optical radiation transmitted along one of said cores to be switched between said waveguides depending upon the refractive index of said interguide region, the material in said interguide region comprising a semiconductor,
passing a current internally through a portion of said waveguides to heat said portion and thereby alter the refractive index of said portion, wherein said portion forms a part of a diode means, and
adjusting said current to adjust the refractive index of the heated portion and thereby the optical switching between said waveguides.

7. The method of claim 6, wherein the current is passed through said interguide region.

8. The method of claim 7, wherein said cores are substantially parallel to each other and mutually separated by said interguide region, said interguide region comprising a common cladding for said cores, said waveguides being close enough to each other for evanescent coupling, the refractive index of said interguide region being controllable in response to said current to control the spatial period of said evanescent coupling.

9. The method of claim 7, wherein said waveguides intersect each other along an interaction axis defined by said interguide region, the refractive index of said interguide region being controllable in response to said current between a first value at which said interguide region produces total internal reflection for said one waveguide to retain optical radiation within said one waveguide, and a second value at which said interguide region presents an optically transmissive path for switching optical radiation from said one waveguide to the other.

10. The method of claim 7, wherein said cores and interguide region are formed from a common material, said interguide region having a lesser thickness than said cores and a correspondingly lower refractive index in the absence of said current.

11. The method of claim 10, wherein said common material has a refractive index with a finite thermal coefficient, and the control range of said current includes a current level at which the refractive indices of said cores and interguide region are substantially equal.

12. The method of claim 7, wherein a metal contact is established to said semiconductor material in the interguide region to form a Schottky diode therewith, and said current is passed through said semiconductor material by forward biasing said Schottky diode.

13. The method of claim 6, wherein the current is passed through one of said cores, said cores being substantially parallel to each other and separated by said interguide region, said waveguides being close enough to each other for evanescent coupling, wherein said current is controlled between levels that respectively enable and inhibit said evanescent coupling.

14. A variable optical waveguide, comprising:
an optically transmissive core,
a cladding forming a boundary with said core and containing within said core optical radiation which is incident on said boundary at no more than the critical angle for total internal refection established by the refractive index differential between said core and cladding, at least one of said core and said cladding comprising a semiconductor material,
a diode means established in the semiconductor material of a selected one of said core and said cladding for internally heating the semiconductor material in which said diode means is established, and
means for controllably biasing said diode means to pass a current through said diode means, said current heating the semiconductor material through which the current passes to change the refractive index differential between said core and cladding to switch between transmission and reflection of incident light at said boundary.

15. The variable optical waveguide of claim 14, said one material defining the cladding for the optical waveguide, wherein said current is adjusted to adjust the refractive index of said cladding relative to that of the core, and thereby the critical angle for total internal reflection of optical radiation propagating along said core.

16. The variable optical waveguide of claim 15, wherein said cladding and core are lateral to each other and are formed from a common material, said cladding having a lesser thickness than said core and a correspondingly lower effective refractive index in the absence of said current.

17. The variable optical waveguide of claim 16, wherein said common material having a refractive index with a finite thermal coefficient, and the control range for said current includes a current level at which the effective refractive indices of said core and cladding are substantially equal.

18. The variable optical waveguide of claim 14, said cladding being the selected one of said core and said cladding in which said diode means is established, and said diode means includes a metal contact established to said semiconductor material in said diode mean to form a Schottky diode therewith, and said current is passed through said semiconductor by forward biasing said Schottky diode.

19. A thermally controlled optical switch, comprising:
- a pair of waveguides formed in semiconductor material an including respective cores and claddings, at least a portion of the claddings for each waveguide comprising an interguide region that is common to both waveguides, the material for said cores and interguide region being selected and said waveguides being configured with respect to each other to enable optical radiation transmitted along one of said cores to be switched between said waveguides depending upon the refractive index of said interguide region, and
- diode means for controllably directing a current through a portion of said waveguides to heat said portion and thereby alter the refractive index of said portion by an amount sufficient to effect optical switching between said waveguides.

20. The optical switch of claim 19, wherein said current is passed through said interguide region.

21. The optical switch of claim 20, wherein said waveguides are substantially parallel to each other with their cores separated from each other by said interguide region over a switching length, said cores being close enough to each other over said switching length to exhibit evanescent coupling, said current directing means controlling the magnitude of said current between first and second switching states corresponding to first and second evanescent coupling periods, said switching length being substantially equal to an odd number of evanescent coupling half-periods for one switching state, and to an even number of evanescent coupling half-periods for the other switching state.

22. The optical switch of claim 20, wherein said waveguides intersect each other along an intersection axis defined by said interguide region, the refractive index of said interguide region being controllable in response to said current between a first value at which said interguide region produces total internal reflection for said one waveguide to retain optical radiation within said one waveguide, and a second value at which said interguide region presents an optically transmissive path for switching optical radiation from said one waveguide to the other.

23. The optical switch of claim 20, wherein said cores and interguide region are formed from a common material, said interguide region having a lesser thickness than said cores and a correspondingly lower refractive index in the absence of said current.

24. The optical switch of claim 23, wherein said common material has a refractive index with a finite thermal coefficient, and the control range for said current includes a current level at which the refractive indices of said cores and interguide region are substantially equal.

25. The optical switch of claim 20, said interguide region comprising a semiconductor, said current directing means comprising a metal contact forming a Schottky diode with said semiconductor on one side thereof, and further comprising contact means on the other side of said semiconductor for receiving current from said Schottky diode.

26. The optical switch of claim 19, wherein the current is passed through one of said cores, said cores being substantially parallel to each other and separated by said interguide region, said waveguides being close enough to each other for evanescent coupling, wherein said current is controlled between levels that respectively enable and inhibit said evanescent coupling.

27. The optical switch of claim 19 wherein said diode means comprises a PN diode.

* * * * *